United States Patent [19]

Nagai

[11] Patent Number: 5,251,117
[45] Date of Patent: Oct. 5, 1993

[54] STRUCTURE OF A DIFFUSING LENS FOR A LIGHT EMITTING DIODE

[75] Inventor: Michio Nagai, Tokyo, Japan
[73] Assignee: Nec Corporation, Japan
[21] Appl. No.: 839,917
[22] Filed: Feb. 21, 1992

[30] Foreign Application Priority Data

Feb. 21, 1991 [JP] Japan ................. 3-048902

[51] Int. Cl.$^5$ ............................. G08B 5/22
[52] U.S. Cl. ................... 362/311; 362/326; 362/364; 362/800
[58] Field of Search ............ 362/26, 31, 32, 800, 362/311, 326, 364; 340/762, 815.03, 815.31

[56] References Cited

U.S. PATENT DOCUMENTS 4,779,166 10/1988 Tanaka et al. ............. 362/31
5,068,652 11/1991 Kobayashi ............... 362/800

FOREIGN PATENT DOCUMENTS 0362993 4/1990 European Pat. Off. .
2747536 4/1979 Fed. Rep. of Germany .
9712960 1/1988 Fed. Rep. of Germany .

Primary Examiner—Albert J. Makay
Assistant Examiner—L. Heyman
Attorney, Agent, or Firm—Ostrolenk, Faber, Gerb & Soffen

[57] ABSTRACT

A structure of a diffusing lens for a light emitting diode (LED). The diffusing lens is mounted on, for example, part of the casing of a receiver included in a telephone. A relatively thick plate-like diffusing lens is press fitted in a slot formed in an end portion of the receiver. Implemented by a light transmitting member, the lens transmits light issuing from an LED in a direction perpendicular to the thicknesswise direction thereof while diffusing it in a predetermined direction. Two holes are formed through the lens in the thicknesswise direction, and each receives and retains an LED therein. Two leads extending out from each LED are drawn out from both ends of the associated hole of the lens and connected to a flexible printed circuit board.

16 Claims, 3 Drawing Sheets

STRUCTURE OF A DIFFUSING LENS FOR A LIGHT EMITTING DIODE

BACKGROUND OF THE INVENTION

The present invention relates to a lens for diffusing in a predetermined direction light which issues from a light emitting diode (LED) and, more particularly, to the structure of such a lens which is built in part of the casing of electronic equipment having only a limited space therein.

A portable telephone, cordless telephone or similar equipment has a casing formed with a slot, and a diffusing lens received in the slot. When a call arrives at the telephone, an LED accommodated in the casing emits light while the lens diffuses the light to the outside of the casing to alert the user of the telephone to the call. The lens is implemented as a relatively thick plate-like light transmitting member and has the outer surface thereof so configured as to form part of the outer periphery of the casing. The LED is located in close proximity to the lens in the casing and supported by a support member in a predetermined position. The support member is affixed to the casing. Inside the casing, part of the lens is notched to form a recess for receiving the LED.

As stated above, it is necessary with the conventional structure to confine the printed circuit board and the support member affixed to the circuit board and supporting the LED in a predetermined position, i.e., in the recess of the lens in the limited narrow space of the casing. This prevents the various parts from being freely arranged in the casing.

SUMMARY OF THE INVENTION

It is, therefore, an object of the present invention to provide a structure of a diffusing lens which promotes free arrangement of a printed circuit board, LED and lens in the narrow space of an equipment casing.

In accordance with the present invention, in a structure of a diffusing lens comprising a relatively thick plate-like light transmitting member for transmitting light in a direction perpendicular to the thicknesswise direction thereof while diffusing it in a predetermined direction, the diffusing lens is formed with at least one through hole in the thicknesswise direction thereof for receiving an LED therein.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
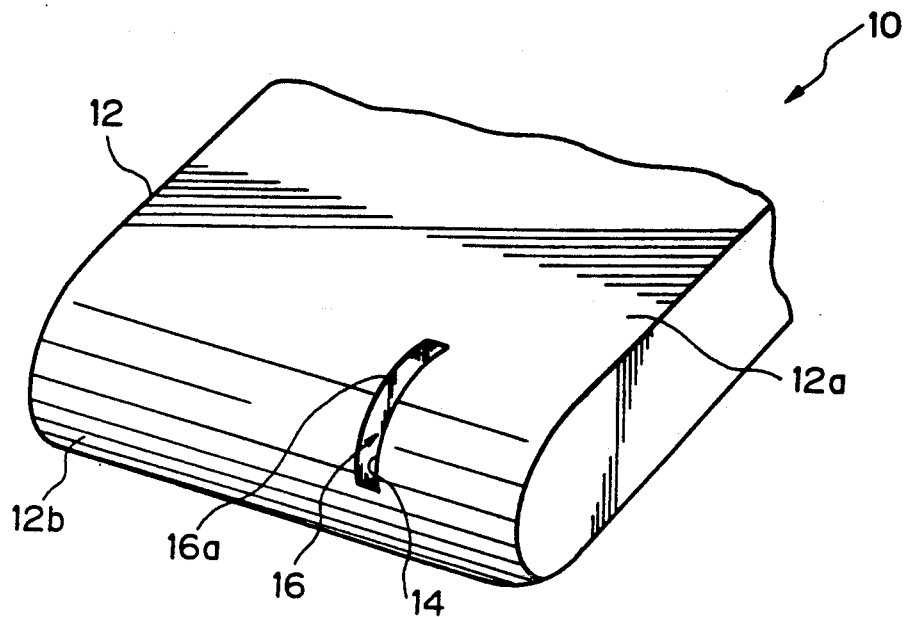
FIG. 1 is a fragmentary perspective view of the casing of a telephone on which a diffusing lens having a conventional structure is mounted.

To better understand the present invention, a brief reference will be made to a conventional structure of a diffusing lens for an LED, shown in FIGS. 1 and 2. As shown, a diffusing lens 16 is mounted on part, i.e., the end of the casing 12 of a telephone 10 by way of example. Specifically, the casing 12 is formed with a slot 14 from the top 12a to the front 12b thereof. The lens 16 in the form of a relatively thick plate is press fitted in the slot 14. Implemented by a light transmitting member, the lens 16 transmits light in a direction perpendicular to the thicknesswise direction thereof while diffusing it in a predetermined direction. The lens 16 has an outer surface 16a which is flush with the outer periphery of the casing 16. A notch or recess 16b is formed in the inner periphery of the lens 16 which faces the interior of the casing 12. In the casing 12, an LED 18 is located in the vicinity of the lens 16 and supported by a support member 20 which is in turn affixed to a printed circuit board 22. The LED 18 is received in the recess 16b of the lens 16.

As stated above, the printed circuit board 22 and the support member 20 supported by the circuit board 22 while positioning the lens 16 in the recess 16b have to be accommodated in the limited space of the casing 12. This brings about a drawback that the various parts cannot be freely arranged in the casing 12, as discussed earlier.

Figure 3:
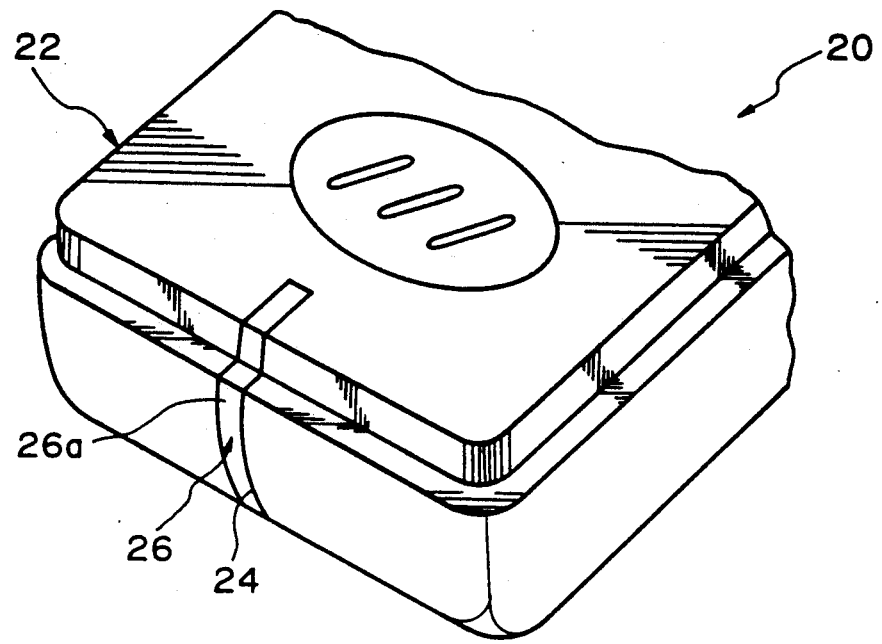
FIG. 3 is a perspective view of a diffusing lens embodying the present invention and mounted on the casing of a telephone.
Figure 4:
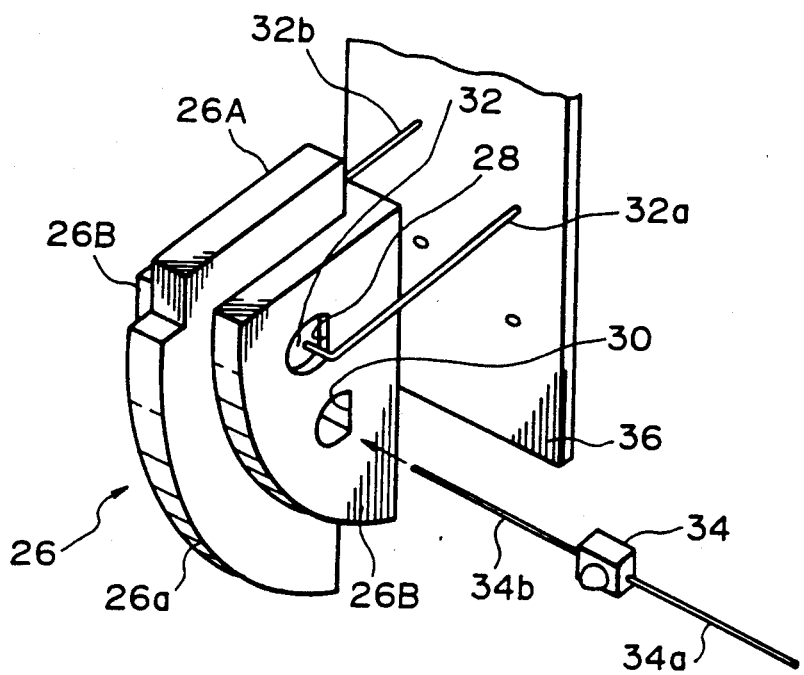
FIG. 4 is a perspective view showing the lens of FIG. 3 specifically.
Figure 5:
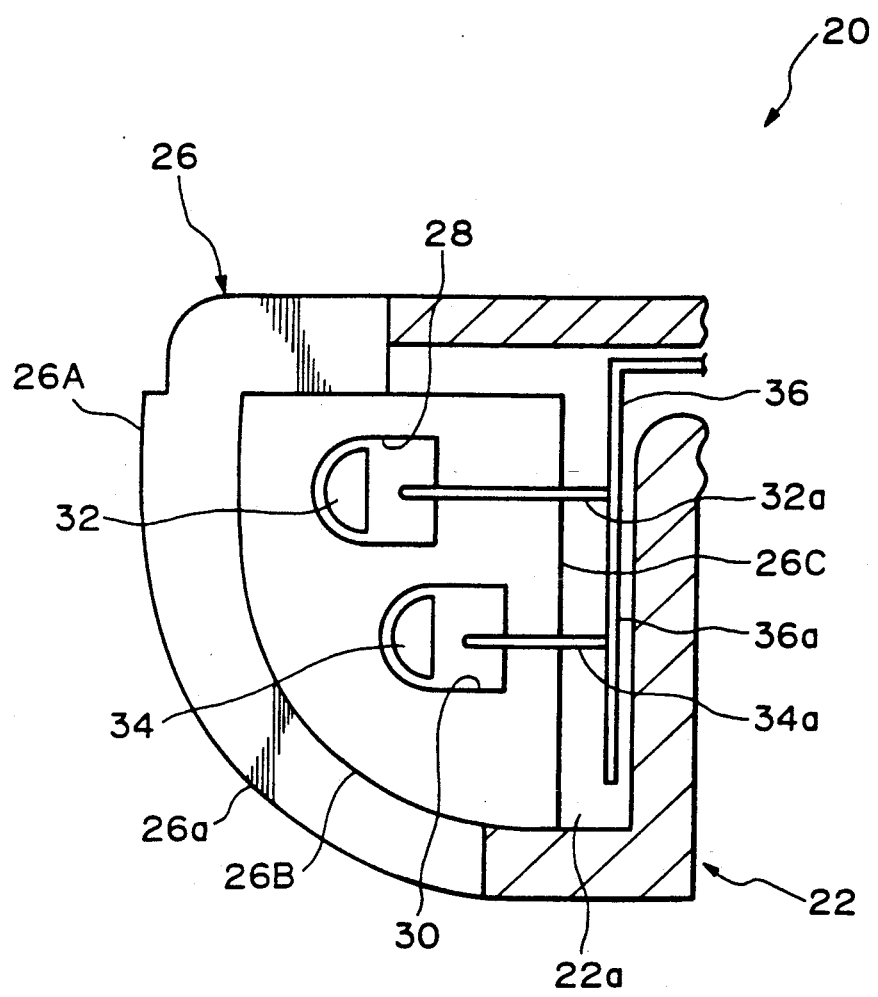
FIG. 5 is a section showing the lens of FIG. 3 fixed in place in the casing.

Referring to FIGS. 3-5, a diffusing lens for an LED embodying the present invention will be described which is mounted on part, i.e., the end of the receiver of a telephone by way of example. As shown, the receiver, generally 20, has a slot 24 at the end of a casing 22 thereof. A diffusing lens 26 in the form of a relatively thick plate is press fitted in the slot 24. The lens 26, like the conventional lens, is implemented by a light transmitting member and transmits light while diffusing it in a predetermined direction. The lens 26 has an end face or emitting face 26a which is exposed to the outside and flush with the outer periphery of the casing 22. More specifically, when the lens 26 is received in the slot 24, the end face 26a forms part of the outer surface of the casing 22. For this purpose, as shown in FIG. 4, the lens 26 is made up of an relatively thick intermediate plate portion 26A having the end face 26a and opposite relative thick plate portions 26B sandwiching the intermediate portion 26A. Holes 28 and 30 are formed through the lens 26 in the thicknesswise direction for receiving LEDs 32 and 34, respectively. A flexible printed circuit board 36 is fixed in place in the casing 22. Leads 32a and 32b and leads 34a and 34b extend out respectively from the LEDs 32 and 34 which are received in the holes 28 and 30. The leads 32a and 32b are drawn out from both ends of the hole 28 and connected to the printed circuit board 36. Likewise, the leads 34a and 34b are drawn out from both ends of the hole 30 and connected to the printed circuit board 36. It is to be noted that the embodiment uses two LEDs 32 and 34 for simply eliminating the irregular distribution of light. As shown in FIG. 5, the printed circuit board 36 made of a flexible material is affixed to the casing 22 with the end portion 36a thereof facing the rear 26c of the lens 26 with the intermediary of a gap 22a.

Figure 2:
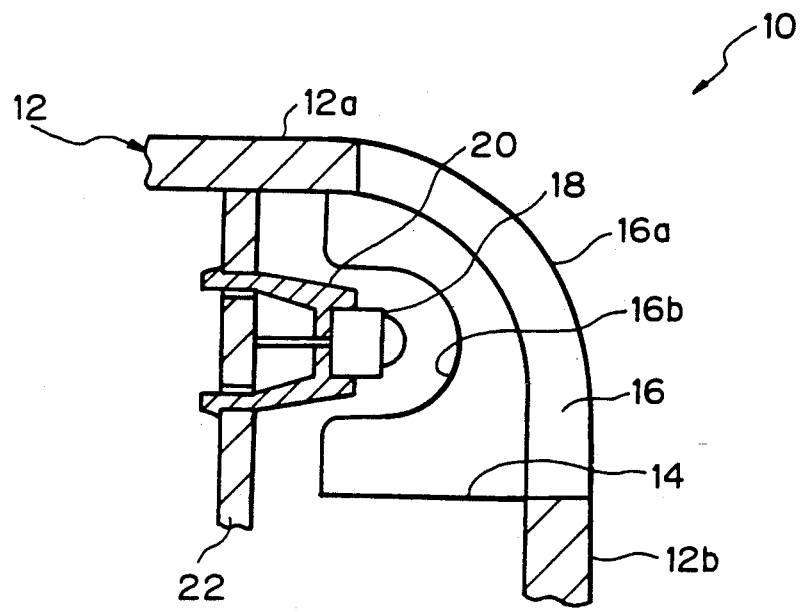
FIG. 2 is a section showing the diffusing lens of FIG. 1 together with members adjoining it.

As stated above, in the illustrative embodiment, the LEDs 32 and 34 are retained by the diffusing lens 26 and not by the conventional support member 20, FIGS. 1 and 2. Therefore, it is not necessary to provide the casing 22 with a space otherwise occupied by the support member 20. In addition, since the printed circuit board 36 does not have to hold such a support member, it can be provided with a thinner, lighter and mechanically less strong configuration than the conventional one 22. Hence, it is possible to mount the lens 26 even on a miniature receiver.

In summary, it will be seen that the present invention provides a diffusing lens which is formed with a hole for receiving and supporting an LED and, therefore, eliminates the need for an exclusive support member heretofore accommodated in an equipment casing for supporting the LED. This reduces the number of constituent parts and the required space and allows, among others, a printed circuit board to be freely arranged in the casing.

Various modifications will become possible for those skilled in the art after receiving the teachings of the present disclosure without departing from the scope thereof.

What is claimed is:

1. A structure comprising:
   a diffusing lens comprising a relatively thick plate-like light transmitting member which is capable of transmitting light in a direction perpendicular to the thicknesswise direction thereof while diffusing said light in a predetermined direction, said diffusing lens being formed with at least one through hole in the thicknesswise direction of said lens for receiving a light emitting diode (LED) therein;
   wherein said diffusing lens is mounted on part of a casing of equipment, part of said diffusing lens being exposed to the outside of said casing and forming a light emitting surface which forms part of the surface of said casing;
   said diffusing lens providing a substantially straight light transmitting path in said perpendicular direction from an LED received in said through hole to said light emitting surface, for transmitting light from said LED directly to the outside of said casing.

2. A structure as claimed in claim 1, wherein said diffusing lens comprises a relatively thick intermediate plate portion which passes through said casing and includes said light-emitting surface, and relatively thick opposite plate portions sandwiching said intermediate plate portion which do not pass through said casing.

3. A structure as claimed in claim 2, wherein a printed circuit board is affixed to said casing and located to face the rear of said diffusing lens, leads extending out from said LED received in said through hole being connected to said printed circuit board.

4. A structure comprising:
   a plate-like diffusing lens which is capable of diffusing light emitted from a light emitting device in a direction perpendicular to the thickness of said lens;
   an equipment casing having a slot formed at an end thereof and fitted with said lens; and
   a through hole formed in said diffusing lens for accommodating a light emitting device therein;
   said diffusing lens providing a substantially straight light transmitting path in said perpendicular direction from a device received in said through hole to said light emitting surface, for transmitting light from said device directly to the outside of said casing.

5. A structure as claimed in claim 4, further comprising a printed circuit board to which at least two connection leads of said light emitting device are electrically connected.

6. A structure as claimed in claim 5, wherein said printed circuit board comprises a flexible printed circuit board.

7. A structure as claimed in claim 4, wherein said light emitting device comprises a light emitting diode.

8. A structure as claimed in claim 4, wherein the outer surface of said diffusing lens is flush with the outer surface of said casing.

9. A method of mounting a light emitting device in a case of equipment, comprising the steps of:
   forming a slot in part of said casing;
   fitting a plate-like diffusing lens in said slot;
   forming a through hole in the thicknesswise direction of said lens;
   accommodating said device in said through hole;
   providing a substantially straight light transmitting path via said diffusing lens in a direction perpendicular to said thicknesswise direction from an LED received in said through hole to said light emitting surface, for transmitting light from said device directly to the outside of said casing.

10. A method as claimed in claim 9, further comprising the step of electrically connecting the leads of said device to a flexible printed circuit board.

11. A structure as in claim 1, further comprising an LED received in said through hole.

12. A structure as in claim 1, wherein said diffusing lens has at least an additional through hole for accommodating a corresponding additional LED, so as to improve the uniformity of light distribution through said light emitting surface.

13. A structure as in claim 12, further comprising an LED received in said additional through hole.

14. A structure as in claim 4, further comprising a light emitting device received in said through hole.

15. A structure as in claim 4, wherein said diffusing lens has at least an additional through hole for accommodating a corresponding additional light emitting device, so as to improve the uniformity of light distribution through said light emitting surface.

16. A structure as in claim 12, further comprising a light emitting device formed in said additional through hole.

* * * * *